(12) United States Patent
Swanson et al.

(10) Patent No.: US 9,157,814 B2
(45) Date of Patent: Oct. 13, 2015

(54) APPARATUS AND METHODS FOR TIME DOMAIN MEASUREMENT USING PHASE SHIFTED VIRTUAL INTERVALS

(71) Applicants: Paul David Swanson, Santee, CA (US); Richard L. Waters, San Diego, CA (US); Charles Tally, San Diego, CA (US)

(72) Inventors: Paul David Swanson, Santee, CA (US); Richard L. Waters, San Diego, CA (US); Charles Tally, San Diego, CA (US)

(73) Assignee: United States of America, as Represented by the Secretary of the Navy, Washington, DC (US)

( * ) Notice: Subject to any disclaimer, the term of this patent is extended or adjusted under 35 U.S.C. 154(b) by 92 days.

(21) Appl. No.: 14/230,764

(22) Filed: Mar. 31, 2014

(65) Prior Publication Data

US 2014/0305213 A1    Oct. 16, 2014

Related U.S. Application Data

(63) Continuation-in-part of application No. 13/168,603, filed on Jun. 24, 2011.

(51) Int. Cl.
*G01P 15/02* (2013.01)
*G01L 1/04* (2006.01)
*G01P 15/097* (2006.01)
*G01L 5/00* (2006.01)

(52) U.S. Cl.
CPC ............... *G01L 1/044* (2013.01); *G01L 5/0057* (2013.01); *G01P 15/097* (2013.01)

(58) Field of Classification Search
CPC ..... G01P 15/02; G01P 15/097; G01L 5/0057; G01L 1/044
USPC ....................................................... 324/76.11
See application file for complete search history.

(56) References Cited

U.S. PATENT DOCUMENTS

2012/0326700 A1    12/2012   Swanson et al.

*Primary Examiner* — Thomas F Valone
(74) *Attorney, Agent, or Firm* — SCC Pacific Patent Office; Arthur K. Samora; Kyle Eppele

(57) ABSTRACT

Systems and methods for perturbation analysis of harmonic oscillations in the time domain according to several embodiments can include a time domain switching sensor and a resonator for imposing a first oscillation and a second oscillation on the sensor. The first and second oscillations can have the same amplitude A and period P, but can have a known phase shift. The sensor can use a time interval, which can be defined by the time between when the sensor passes a reference point due to motion caused by the first oscillation and when the sensor passes the same reference point, but due to motion caused by the second oscillation. With this configuration an improved accuracy of measurement for the system can be realized.

18 Claims, 4 Drawing Sheets

Possible Portable 6 axis design with built in resonator

US 9,157,814 B2

APPARATUS AND METHODS FOR TIME DOMAIN MEASUREMENT USING PHASE SHIFTED VIRTUAL INTERVALS

This Application is a continuation-in-part of prior application Ser. No. 13/168,603, filed Jun. 24, 2011 by Paul D. Swanson and Richard Waters, for an invention entitled "Apparatus and Methods For Time Domain Measurement of Oscillation Perturbations", and assigned to the same assignee as the present invention. The contents of the '603 application are hereby incorporated by reference herein.

FEDERALLY-SPONSORED RESEARCH AND DEVELOPMENT

The United States Government has ownership rights in this invention. Licensing inquiries may be directed to Office of Research and Technical Applications, Space and Naval Warfare Systems Center, Pacific, Code 72120, San Diego, Calif., 92152; telephone (619) 553-5118; email: ssc pac t2@navy.mil, referencing NC 101761.

FIELD OF THE INVENTION

The present invention pertains generally to perturbation analysis of harmonic oscillations by analysis of the time domain. More specifically, the present invention pertains to micro-electromechanical (MEMS) measuring devices and methods that incorporate perturbation analysis of harmonic oscillations. The invention is particularly, but not exclusively, useful as time domain switched inertial sensors (TDSIS) that measure inertial force by imposing harmonic oscillations with a known phase difference on the TDSIS and then noting when the TDSIS passes known reference points due to the motion imposed by the oscillations.

BACKGROUND OF THE INVENTION

Accurate measurements of parameters (such as for example force) are often required in a wide variety of applications. Micro-electromechanical sensors (MEMS) devices such as accelerometers have been extensively used in, e.g., dynamic distance and speed measurements, inclination, machine vibration, buildings and structural monitoring, component placement in manufacturing, process control systems and safety installations. Angular rotation rate MEMS (also referred to as the gyroscope or the rate sensors) are useful in, inter alia, navigation, automotive (e.g., electronic stability control), entertainment (e.g., user motion detection for game consoles), photography (e.g., image stabilization), animal behavior studies and many other applications. Pressure sensors are similarly widely used in applications such as weather, industrial monitoring and control, aircraft and automotive, oil and gas exploration, flow sensing, acoustics, etc. Many other parameter measurement applications exist (such as for example, magnetic force measurements used in navigation and mineral exploration, or electrostatic force measurements used in microscopy, etc.).

In the context of a force measurement, the typical prior art force sensor measures displacement (also often referred to as "deflection") of a spring-suspended proof mass in order to estimate a force acting on the proof mass. The methods of measuring such deflection vary in accuracy, variability, and cost of implementation. Various measurement approaches may be used, such as for example capacitive, piezo-resistive, electron tunneling sensing, and optical interferometery, in order to determine the proof mass deflection. In all of these approaches, the deflection (and thus the force) is inferred as a function of a measured voltage (or electric current), and therefore is inevitably subject to measurement errors due to, inter alia, thermal and electromagnetic noise. As a result, most existing force sensor solutions require very accurate signal conditioning circuitry (such as precision amplifiers, filters, voltage references, etc.), as well as periodic recalibrations to account for sensor aging (including e.g., changes in the physical properties or characteristics of the "spring" and/or proof mass with time), and electrical component drift.

As an alternative, perturbation analysis can be accomplished in the time domain, as opposed to measure the deflection of a MEMS device. Time domain switched inertial sensors in the prior art can typically work by assuming that the displacement of a harmonically oscillating proof mass on a spring is going to be the sum of the sinusoidal harmonic oscillation and the displacement due to an external force. By curve fitting time intervals between known displacements to this anticipated behavior, the extraction of the value of the external force can be determined. If the external force is constant for the period of the harmonic oscillation, a simple cosine plus offset curve fit can be used. However, if the force is changing significantly during the period of the oscillation, a more computationally intensive polynomial fit should be used. If the amount of time the force must be constant could be minimized, the simple cosine curve fit could be used with greater accuracy.

One way to allow the use of the simple cosine plus offset curve fit with greater accuracy can be by greatly reducing the time interval during which the force needs to remain near constant. This can be done by imposing two oscillations on the device, and then measuring the beginning of an interval from the crossing past a reference past due to one harmonic oscillation while measuring the end of the interval when the device crosses the reference point due to an identical harmonic oscillator (same amplitude and period) that has a known phase shift from the first harmonic, for example, oscillating 180 degrees out of phase from the first.

If the two oscillations are identical in period and amplitude, but have a known phase shift, triggering information from one oscillation should be identical to the other after period of time associated with the phase shift. By using the virtual interval determined by adding the phase difference to the triggering of the two out of phase oscillations, the time period for which the offsetting influence is needed to be relatively constant become much smaller. This improves the accuracy of the measurement. This can work for two 180 degrees out of phase sinusoidal oscillations, or can work by having the perturbation added and subtracted to identical sinusoidal oscillations.

In view of the above, it is an object of the present invention to provide a MEMS device that performs the measuring function using perturbation analysis of harmonic oscillations in the time domain. Another object of the present invention is to provide a time domain switched inertial sensor (TDSIS) that measures time intervals between harmonic oscillations of the proof mass instead of displacement, in order to determine inertial force. Another object of the present invention is to provide a TDSIS that minimizes that time required for the inertial force to be nearly constant. Yet another object of the present invention is to provide a TDSIS with improved accuracy. Still another object of the present invention is to provide a TDSIS with simplified structure, which can be manufactured and used in a cost-efficient manner.

SUMMARY OF THE INVENTION

An inertial navigation system and methods according to several embodiments can include a time domain switching sensor and a resonator for imposing oscillations on the sensor. The resonator can impose a first oscillation and a second oscillation on the sensor. The first oscillation can have a first oscillation with amplitude A and a period P, and the second oscillation can have the same amplitude A and the same period P as said first oscillation, but can also have a known phase shift. In some embodiments, the phase shift can be 180 degrees, while the sensor can be a cantilevered mass-on-spring with a rigid frame and a cantilevered portion.

The system can use a time interval, which can be defined by the time between when the sensor passes a reference point due to motion cause by the first oscillation and the time when the sensor passes the same reference point, but due to motion caused by the second oscillation, in order to measure acceleration (and by extension, an external force) on the system. In several embodiments, the time interval measured can be less than half the period P, which can minimize the time that is required for the force to remain constant, which can further result in improved accuracy of the measurement for the inertial system.

BRIEF DESCRIPTION OF THE DRAWINGS

The novel features of the present invention will be best understood from the accompanying drawings, taken in conjunction with the accompanying description, in which similarly-referenced characters refer to similarly-referenced parts, and in which.

DETAILED DESCRIPTION OF THE EMBODIMENTS

Figure 1:
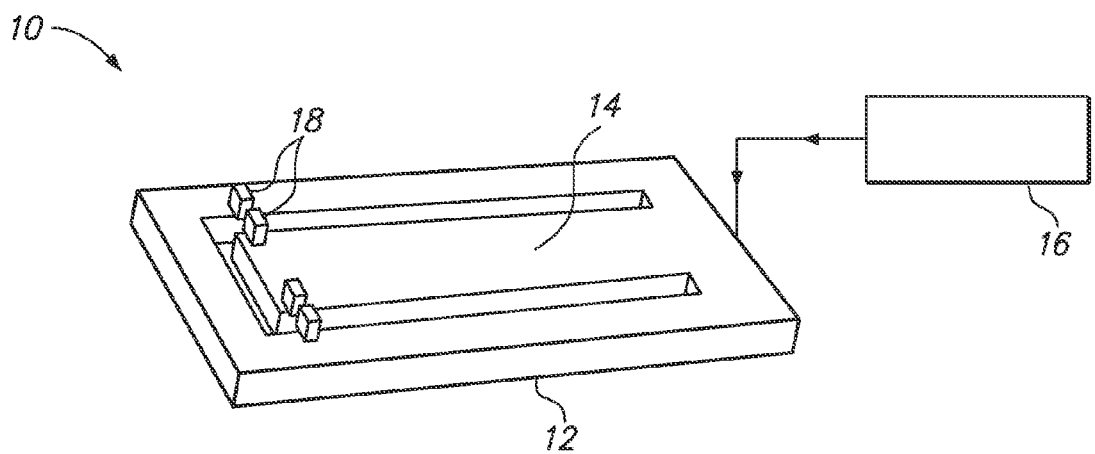
FIG. 1 is a block diagram of a time domain switching inertial sensor of the present invention, according to several embodiments.

In brief overview, an explanation of theory between the Time Domain Switched Inertial Sensors (TDSIS) of the present invention can be presented. A silicon MEMS cantilever mass-on-spring accelerometer with minimal damping (sealed under vacuum) can be used as an example. Mass-on-a-spring inertial sensing devices can use Hooke's law of elasticity and Newton's laws of motion to relate the stationary displacement x of the mass from its rest position to an acceleration a caused by a constant applied force F:

$$F = -kx \quad (1)$$
Hook's Law $$a = \frac{F}{m} \quad (2)$$
Newton's $2^{nd}$ law where k is the spring constant of the spring and m is the mass of the proof mass on the spring. Such sensors can equate the displacement of the mass solely with the force causing acceleration, and therefore oscillation of the mass is a source of error.

If the center point of the oscillation could be measured, it would be equivalent to measuring the displacement after the oscillation had dampened to a stationary position. However, it is far easier to simply dampen the oscillation quickly, rather than to chart the displacement of the oscillator and determine its center point. This conclusion is based on the idea that the best way to know where the proof mass is at any given time for a mass-on-a-spring sensor can be to measure its physical location at that time.

A harmonic oscillator, on the other hand, has a very well-known relationship between position and time. If the period and amplitude of the oscillation are known, its location at all times can be determined solely by noting at what time it is at a specific known location, as opposed to measuring its position. Conventional inertial sensors output an analog signal whose value (with a certain amount of error) is linear with acceleration. An inertial sensor based on harmonic oscillation would output digital triggers based on when the proof mass passes known locations. The advantages of such a system can become evident after deriving the relationship between the time intervals and acceleration, as described below.

For an undamped mass-on-a-spring harmonic oscillator with an external constant force F applied in the direction of the spring, the displacement x of the mass at time t can be given by:

$$x = A\cos\left(\frac{2\pi t}{P}\right) - d \quad (3)$$

Where P is the period of the resonant frequency, A is the amplitude of the oscillation, and d is the displacement caused by the force F. For a given displacement $X_1$, if the time intervals between when $x=X_1$ are known, then the sum of two adjacent time intervals will equal the period P. If t=0 is defined as the center point of one of the time intervals ($T_1$), then we can solve for d as a function of the oscillation amplitude A:

$$d = A\cos\left(\frac{\pi T_1}{P}\right) - X_1 \quad (4)$$

In order to solve for the oscillation amplitude A, the time interval $T_2$ (centered on t=0) between a second known displacement point, $x=X_2$, is needed. The result can be two Equations with two unknowns:

$$\begin{cases} d = A\cos\left(\frac{\pi T_1}{P}\right) - X_1 \\ d = A\cos\left(\frac{\pi T_2}{P}\right) - X_2 \end{cases} \quad (5)$$

This can be rearranged to yield $$A = \frac{X_1 - X_2}{\cos\left(\frac{\pi T_1}{P}\right) - \cos\left(\frac{\pi T_2}{P}\right)} \quad (6)$$

And

-continued $$d = \frac{(X_1 - X_2)\cos\left(\frac{\pi T_1}{P}\right)}{\cos\left(\frac{\pi T_1}{P}\right) - \cos\left(\frac{\pi T_2}{P}\right)} - X_1. \quad (7)$$

From (1) the force required to displace the oscillation the distance d is $$F = -kd = -k\left(\frac{(X_1 - X_2)\cos\left(\frac{\pi T_1}{P}\right)}{\cos\left(\frac{\pi T_1}{P}\right) - \cos\left(\frac{\pi T_2}{P}\right)} - X_1\right). \quad (8)$$

Since the resonant frequency $\omega_0$ of an undamped harmonic oscillator is defined as $$\omega_0 = \frac{2\pi}{P}\sqrt{\frac{k}{m}}, \quad (9)$$

From Equation (2) the acceleration of the entire system can be written as $$a = \frac{F}{m} = \frac{-kd}{m} = -\left(\frac{2\pi}{P}\right)^2\left(\frac{(X_1 - X_2)\cos\left(\frac{\pi T_1}{P}\right)}{\cos\left(\frac{\pi T_1}{P}\right) - \cos\left(\frac{\pi T_2}{P}\right)} - X_1\right) \quad (10)$$

Note that in Equation (10), $X_1$ and $X_2$ are the only predefined parameters, and the accuracy is dependent on the accuracy of measuring time intervals $T_1$ and $T_2$ and the distances $X_1$ and $X_2$. No other measured variables are required to calculate the applied acceleration. Furthermore, $X_1$ and $X_2$ are predefined parameters that do not drift in time so the expected output of this device should be extremely stable. Equation (10) assumes the applied force is constant over the time intervals $T_1$ and $T_2$. If the force varies within this time period, the maxima (or minima) of the oscillation will not be the center of the time intervals, causing a phase error in Equation (4). Surprisingly, Equation (10) can still be remarkably accurate for slowly changing force (with respect to the oscillation period).

Referring now to FIG. 1, a time domain switched inertial sensor (TDSIS) of the present invention according to several embodiments can be shown, and can be designated by reference character 10. As shown in FIG. 1, sensor 10 can include a rigid frame 12 and a cantilevered portion 14 extending from rigid frame 12. Sensor 10 can include a resonator 16, for imposing harmonic oscillations on cantilevered portion 14. More specifically, resonator 16 can impose a first harmonic oscillation and a second harmonic oscillation on cantilevered portion 14. The first and second harmonic oscillations can have the same amplitude A and period P, but be out of phase by a known phase difference. The manner in which the first and second harmonic oscillations cooperate to accomplish the aims of the present invention can be described more fully below. Sensor 10 can also include proximity tips 18 for determining when cantilevered portion passes a reference point R (Reference point R can be best in FIG. 2). The manner in which it can determined when cantilevered portion pass reference point R is described in greater detail in U.S. patent application Ser. No. 13/168,603, filed Jun. 24, 2011 by Paul D. Swanson and Richard Waters, for an invention entitled "Apparatus and Methods For Time Domain Measurement of Oscillation Perturbations", and assigned to the same assignee as the present invention. The contents of the '603 application are hereby incorporated by reference.

Figure 2:
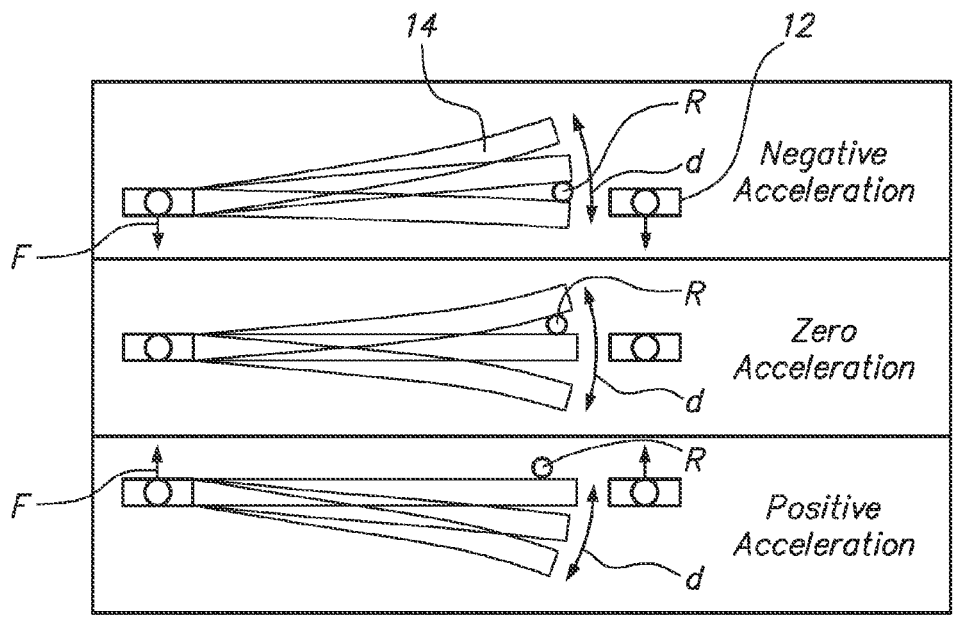
FIG. 2 is a side view of the inertial sensor of FIG. 1 during operation of the sensor.

Referring now to FIG. 2, the effect of the harmonic oscillations can be shown. The imposed harmonic oscillations can act on the cantilevered portion 14. More specifically, the first and second oscillations can act on cantilevered portion 14 of sensor 10 to cause a positive acceleration, which can cause cantilevered portion 14 to move downward. Similarly, as the harmonic oscillation continues, force F eventually causes a negative (downward) acceleration, which can cause cantilevered portion 14 to move upward. As this occurs cantilevered portion 14 passes through the above-cited reference point R (Passage past reference point R is determined by proximity tips 18). Instead of measuring the distance d traveled by cantilevered portion 14, the time intervals between when cantilevered portion passes reference point R (which is determined by proximity tips 18) can be measured, and further used to determine the acceleration of sensor 10.

Time domain switched inertial sensors work by assuming the displacement of a harmonically oscillating proof mass on a spring is going to be the sum of the sinusoidal harmonic oscillation and the displacement due to an external force. By curve fitting time intervals between known displacements to this anticipated behavior, the extraction of the value of the external force can be determined. If the external force is constant for the period of the harmonic oscillation a simple cosine plus offset curve fit can be used, instead of the more computationally intensive polynomial fit. If the force is changing significantly during the period of the oscillation, then the computationally intensive polynomial fit typically must be used. The method of curve fit being described in this patent allows the use of the simple cosine plus offset curve fit to be used with greater accuracy by greatly reducing the time the force needs to remain near constant.

For the present invention according to several embodiments, and referring briefly back to Equation (10), if the beginning and ending of the time intervals $T_1$ and $T_2$ could be measured at nearly the same time, the external force would have less time to vary, and thus the measurement would be more accurate. One way of doing this can be to reduce the period (increase the frequency) of oscillation. The problem with this strategy is that eventually accuracy can be lost due to the limits of resolution of the time measurement. The intervals $T_1$ and $T_2$ can be defined as the time (or phase shift) between when the oscillating mass rises past a known location and when it falls past the same location. In sum, the time resolution issue can be overcome by imposing a second oscillation on cantilever portion 14 by resonator 18. The second oscillation can have the same amplitude A and period P, but have a known phase shift. With this configuration, the beginning of an interval defined by when cantilevered portion 14 crosses reference point R due to the first oscillation and the second oscillation can be used.

Figure 3:
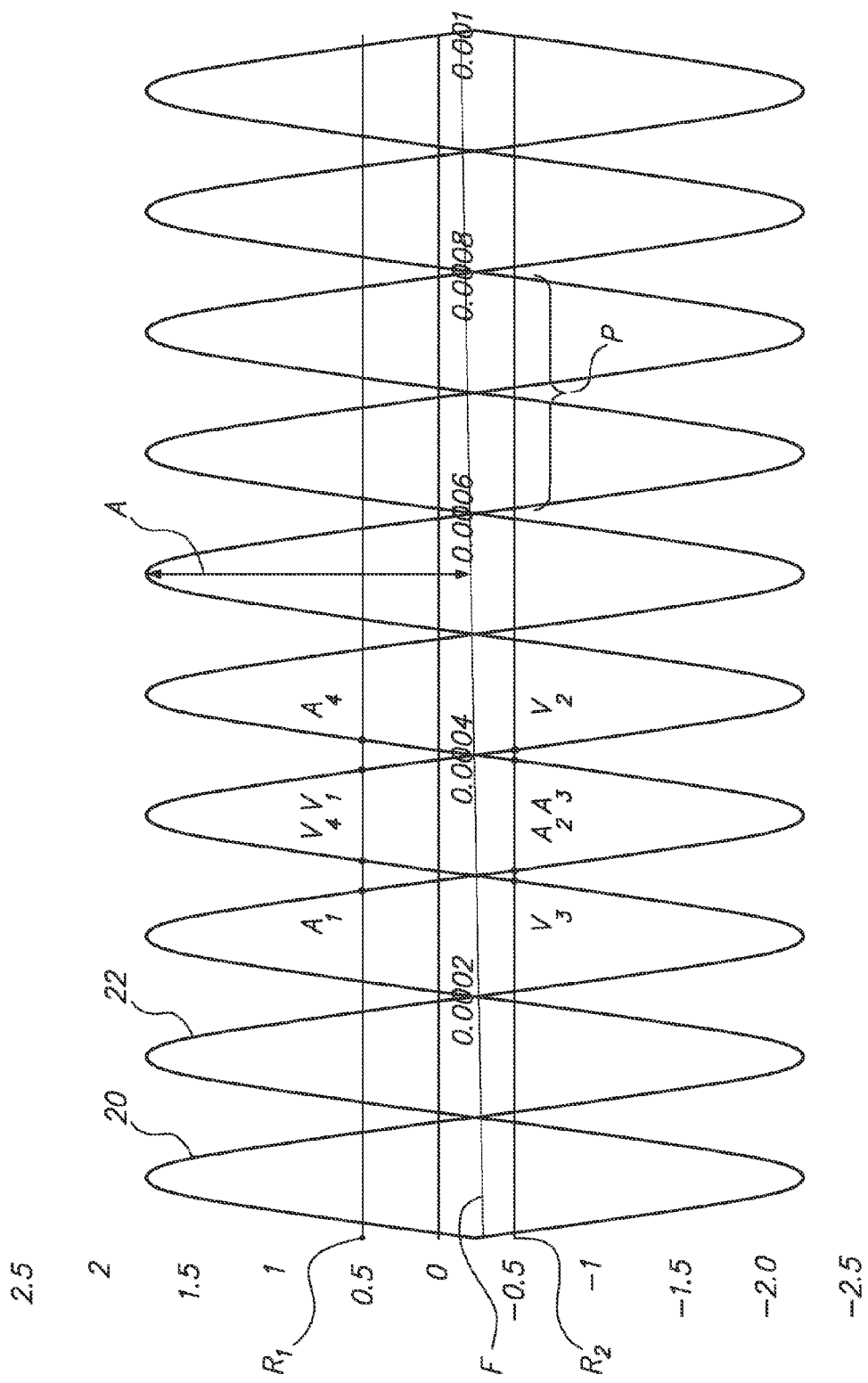
FIG. 3 is a graph of the oscillations, which have been imposed on the sensor of FIG. 1.

Referring now to FIG. 3, a graphical depiction depicting the relationship between the phase shifted first oscillation and second oscillation can be shown. The first oscillation can be demonstrated by wave 20 and the second oscillation can be depicted by wave 22. Waves 20 and 22 can have the same amplitude A and period P, and can further have a known phase difference. In FIG. 3, the phase shift can be 180°. However, other phase shifts can be used, including and up to a 360° phase shift. Reference positions can be annotated by lines R1 and R2, and the force on the sensor can be depicted by line F in FIG. 3. If the external force was acting on two identical harmonic oscillators 180° out of phase, the duration of a virtual time interval could be determined by adding the 180° phase shift to the interval between when the first oscillator rises past a known location and when the second oscillator falls past the same location. This can be valid whether it is perturbed harmonic oscillators or a perturbed sinusoidal carrier of any nature.

As an example of the above, the force during the time interval ($A_4$-$A_1$) would be measured using the time interval ($A_4$-$V_1$)+P/2, where $A_4$ is the point in time where the cantilevered portion 14 passes reference point $R_1$ due to motion cause by the imposition of the first harmonic oscillation (curve 20), $V_1$ is the point in time where the cantilevered portion 14 passes reference point $R_1$ due to motion caused by the imposition of the second harmonic oscillation (curve 22), and P is the period of the harmonic oscillations. In the same way, the force during the time interval ($A_3$-$A_2$) would be measured using the time interval P/2−($V_2$-$A_3$), where $V_2$ is the point in time where the cantilevered portion 14 passes reference point $R_2$ due to motion caused by the imposition of the second harmonic oscillation (curve 22), $V_1$ is the point in time where the cantilevered portion 14 passes reference point $R_2$ due to motion caused by the imposition of the first harmonic oscillation (curve 20). Because the intervals ($A_4$-$V_1$) and ($V_2$-$A_3$) are much smaller than the intervals ($A_4$-$A_1$) and ($A_3$-$A_2$), the force has less time to vary than in the original cosine curve fit, and thus the calculated external force, using Equations (8)-(10), can be more accurate.

Figure 4:
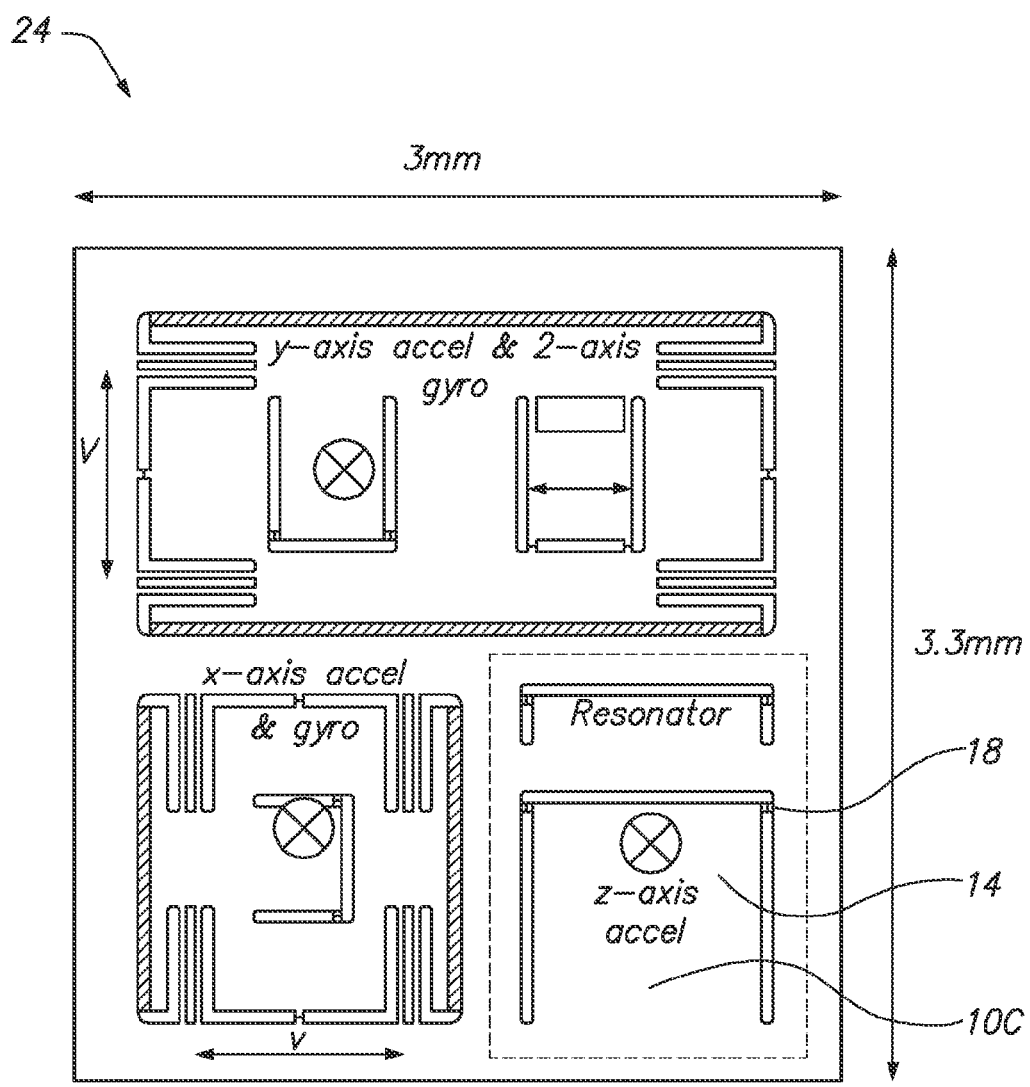
FIG. 4 is a top plan view of a 6-axis embodiment which incorporates the structure and cooperation of structure of the sensor of FIG. 1; and, FIG. 5 is a block diagram, which illustrates steps that can be taken to accomplish the methods of the present invention according to several embodiments.

Referring now to FIG. 4, an inertial navigation system 24 according to several embodiments can be seen. As shown, system 24 can include sensors 10*a*, 10*b*, and 10*c*, for measuring acceleration in the x-axis, y-axis and z-axis, respectively. Resonators 16*a*, 16*b*, and 16*c* can also be included for establishing the first and second oscillations as described above. For clarity (resonators 16*a* and 16*b* are on the underside of system 24 and cannot be seen), only resonator 16*c*, which is part of sensor 10*c*, is shown.

Figure 5:
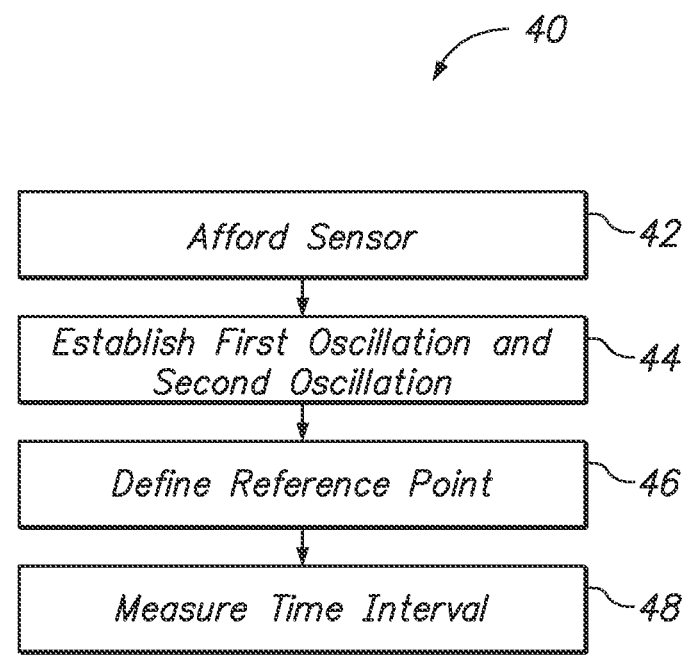

Referring now to FIG. 5, a block diagram which can be used to illustrate the methods of the present invention according to several embodiments can be shown and can be designated by reference character 40. As shown, method 40 can include the initial step of affording the sensor, as shown by block 42. The sensor can have the same structure and cooperation of structure as sensor 10 described above and as shown in FIGS. 1-2. Or, a different sensor could be used. For example, an analog-to-digital converter could be used. Next, a first oscillation and a second oscillation can be imposed on the sensor, as indicted by step 44 in FIG. 5. If the sensor is a mass-on-a-spring type with a rigid frame and cantilevered portion 14 as described above, the oscillations can be imposed on cantilevered portion 14. Step 44 can be accomplished so that first and second oscillations can have the same amplitude A, the same period P, but have a known phase shift. For the ADC embodiment, the second oscillation can have a much smaller amplitude the first oscillation, and in some embodiments, can be imposed on the first oscillation.

The method of the present invention according to several embodiments can further include the step of defining at least one reference point R for the sensor 10, as indicated by block 46 in FIG. 5. As the cantilevered portion passes reference R, a timer interval can be measure, as shown by step 48. The time interval can be the time between when the cantilevered portion 14 passed reference point R as a result of motion imposed by the first oscillation, and the next time cantilevered portion passes reference point R, which can be as a result of the motion imposed by second oscillation. The time interval can be used to determine the acceleration of the device using the simple curve fit method plus offset, using equations (1)-(10) above. The time interval can be measured using proximity tips for the mass-on-spring embodiment discussed above, or the interval can be measured using comparators for and analog-to-digital embodiments disclosed above.

The use of the terms "a" and "an" and "the" and similar references in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A measurement system:
   said measurement system using perturbation analysis of harmonic oscillations in the time domain, and further comprising;
   at least one oscillation means for imposing a first oscillation and a second oscillation on said at least one system;
   said first oscillation and said second oscillation having an amplitude A, a period P and a known phase shift; and,
   said system using a time interval defined by when said system passes a reference point due to said first imposed oscillation is passed, and by when said system passes said reference point, but due to said second imposed oscillation.

2. The system of claim 1 wherein said time interval is less than said period P.

3. The system of claim 2 wherein said time interval is less than one half of said period (P/2).

4. The system of claim 1 wherein said phase shift is 180 degrees.

5. The system of claim 1 wherein said sensor is a cantilevered mass-on-spring comprising a rigid frame and a cantilevered portion extending from said rigid frame, and further wherein said cantilevered portion passes said reference point due to said first oscillation and said second oscillation.

6. A method for measuring inertial force comprising:
A) affording a cantilevered mass-on-spring sensor;
B) establishing a first harmonic oscillation and a second harmonic oscillation on said sensor;
C) defining a reference point for said sensor; and,
D) measuring a time interval between when the sensor passes said reference point due said first harmonic oscillation and when said sensor passes said reference due to said second harmonic oscillation.

7. The method of claim 6, wherein said step B) further comprises the step of:
B1) establishing said first oscillation with an amplitude A and a period P; and,
B2) establishing said second oscillation having the same said amplitude A and the same said period P, and a known phase shift from said first oscillation.

8. The method of claim 7 wherein said time interval in said step D) is less than said period P.

9. The method of claim 7 wherein said time interval in said step D) is less than one half of said period (P/2).

10. The method of claim 9 wherein said phase shift is 180 degrees.

11. The method of claim 10, further comprising the step of:
E) determining acceleration using the time interval from said step D) using a simple curve fit plus offset.

12. The method of claim 6, wherein said step A) is accomplished using a cantilevered mass-on-spring.

13. The method of claim 6, wherein said step A) is accomplished using an analog-to-digital converter, and wherein said step B) is accomplished using an first oscillation having an amplitude A and a period P and a second oscillation having an amplitude A2 and a period P, and where said step D) is accomplished using comparators.

14. A time domain switching inertial sensor (TDSIS):
said TDSIS accomplishing measurement using perturbation to harmonic oscillations in the time domain, and further comprising:
at least one oscillation means for imposing a first oscillation and a second oscillation on said cantilevered portion,
said first oscillation and said second oscillation having an amplitude A, a period P and a known phase shift; and,
said TDSIS using a time interval defined by when said cantilevered portion passes a reference point due to said first imposed oscillation, and when said cantilevered portion passes said reference point due to said second imposed oscillation.

15. The TDSIS of claim 14 wherein said time interval is less than said period P.

16. The TDSIS of claim 14 wherein said time interval is less than one half of said period (P/2).

17. The TDSIS of claim 14 wherein said phase shift is 180 degrees.

18. The TDSIS of claim 14, further comprising:
a rigid frame; and,
a cantilevered portion extending from said rigid frame, said cantilevered portion passing said reference due to said first oscillation and said second oscillation.

* * * * *